No. 738,285. PATENTED SEPT. 8, 1903.
L. S. BORTREE.
HAY RAKE.
APPLICATION FILED APR. 20, 1903.
NO MODEL.
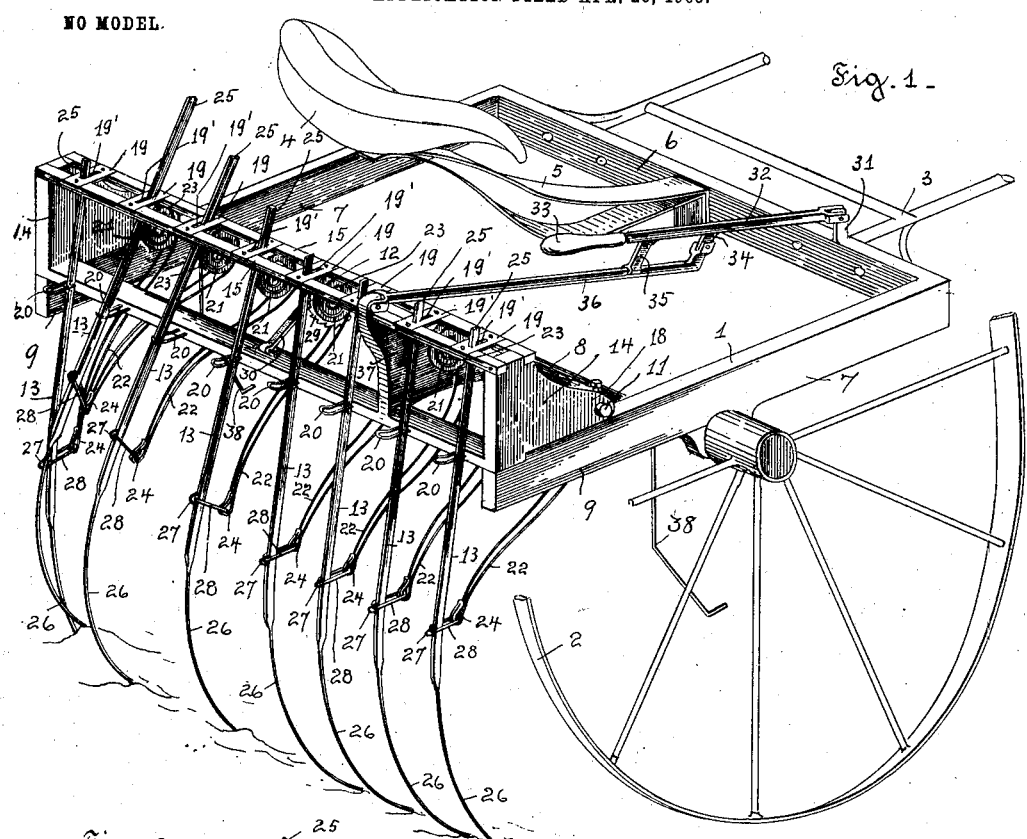
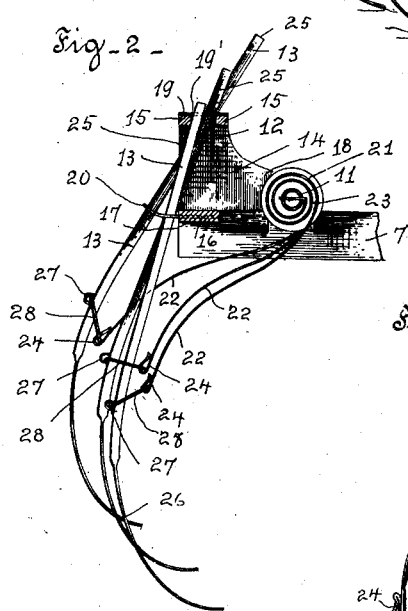
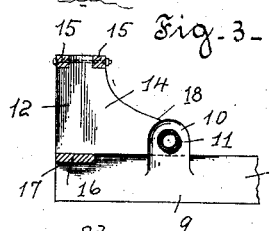
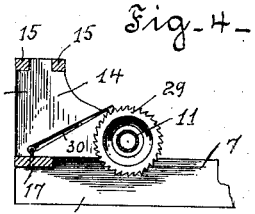
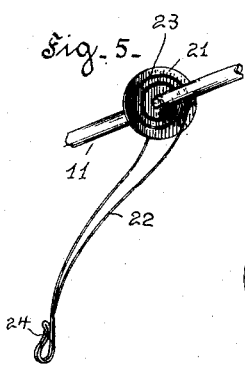
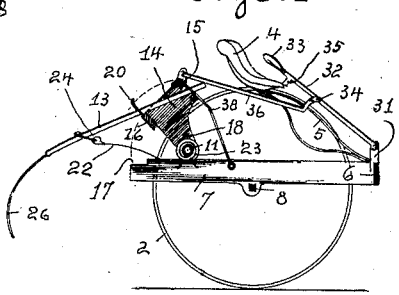
Witnesses
Geo. A. Whitney
Ed. H. LeBeau
Inventor
Louis S. Bortree
By Wilson & Martin
Attorneys
THE NORRIS PETERS CO., PHOTO-LITHO., WASHINGTON, D. C.

No. 738,285. Patented September 8, 1903.

UNITED STATES PATENT OFFICE.

LOUIS S. BORTREE, OF TOLEDO, OHIO.

HAY-RAKE.

SPECIFICATION forming part of Letters Patent No. 738,285, dated September 8, 1903.

Application filed April 20, 1903. Serial No. 153,371. (No model.)

*To all whom it may concern:*

Be it known that I, LOUIS S. BORTREE, a citizen of the United States, residing at 440 Hicks street, in the city of Toledo, in the county of Lucas and State of Ohio, have invented a new and useful Improvement in Hay-Rakes, of which the following is a specification.

My invention relates to a hay-rake, and has for its object to provide an implement of the kind adapted to be drawn by horse-power, wherein the teeth of the rake are adapted to jointly gather and carry with them hay or other light material of the kind loosely scattered over the ground and to be jointly raised at desired intervals to leave the gathered material in bunches or windrows and to individually yield to pass over obstructions projecting above the surface of the ground in the path of any tooth. I accomplish these objects by the novel construction and combination of parts hereinafter described, and illustrated in the drawings, in which—

Figure 1 is an isometric view of my invention. Fig. 2 is a cross-section through the head-frame, showing teeth in different positions therein. Fig. 3 is a like view showing an end bearing for the head-frame. Fig. 4 is a like view with the teeth omitted, showing a ratchet-wheel and pawl arranged to retain tension on the spring-arms. Fig. 5 is an isometric view of one of the spring-arms; and Fig. 6 is a view of the rake, showing the head-frame partially tilted and locked to the frame with the teeth raised to an inoperative position.

In the drawings, 1 designates the frame of my machine, which is suitably mounted on a pair of wheels 2 and provided with thills 3 for hitching a horse thereto and with a driver's seat 4, supported thereon by a spring-bar 5, secured to the front bar 6 of the frame and curved upward and rearward, so as to bring the seat central above the frame. The sides 7 of the frame project rearward beyond the axle 8 of the wheels 2, and the projecting portions 9 are each provided with a bearing 10, set oppositely, in which is mounted parallel with the axle 8 a shaft 11, on which is pivotally mounted a head-frame 12 for the rake-teeth 13. Frame 12 is supported on the projections 9 of the frame and comprises the end pieces 14 and the top head-bars 15 and the bottom head-bar 16, secured, respectively, to the top and bottom edges of the end pieces at their outer end portions, the outer ends of the projections 9 of the frame being provided with notches 17 in their upper edges to receive the bar 16 when the end pieces 14 are resting on the projections. The top edges of the end pieces 14 are cut away from the head-bar 15 toward their forward ends, which are provided with suitable bearings 18 to receive the shaft 11, upon which they are pivotally mounted. Head-bars 15 have secured transversely thereto a plurality of plates 19, let into the tops of the bars at equal intervals of their length. The plates 19 are each provided with an elongated slot 19' lengthwise of the plate. The head-bar 16 has secured to its rear edge an equal number of elongated staples 20, which project rearward in a slight upward curve therefrom.

On the shaft 11, in line with each slot 19 and staple 20, is loosely mounted a disk 21, concentric to the shaft, and secured to the shaft on opposite sides of each disk is a spring-arm 22, formed of a spring-wire doubled on itself and having each of its outer end portions coiled into an involute spring 23 around the shaft, the shaft being provided with a suitable orifice on each side of each disk to receive and secure thereto the end of each coil. The free ends of the spring-arms thus formed are bent to form the hooks 24, and the coils being separated from each other by the disk they are prevented fouling each other in operation.

The rake-teeth 13 have their upper end portions 25 made flat and adapted to be inserted through the elongated staples 20 of the lower head-bar and then through the elongated transverse slots 19' of the plates 19 of the frame 12, and the lower end portions 26 of the teeth are rounded (in cross-section) and curved forward and each tooth, near the junction of the rounded and flattened portions at its back edge, is provided with a suitable eye 27, in which is mounted a link 28, which is closed around the tooth, into which link the hook 24 of the adjacent spring-arm 22, drawn downward and rearward, is inserted and then closed on the body of the arm. The springs 23 are coiled on the shaft 11 to produce a forward pull of the arms 22 on the teeth, by reason of which the front edges of the top end portions of the teeth are drawn against the back edge of the head-bar 16 and their rear edges against the back end of the slots 19' of the plates 19, the lengths of the teeth and the spring-arms being so adjusted that the arms will hold the teeth in their normal position for work slightly above the surface of the ground. The tension of the spring-arms 22 is uniformly adjusted by rotating the shaft 11, which is provided with a ratchet-wheel 29, and the bar 16 with a hook-pawl 30, adapted to engage the ratchet-wheel, whereby the desired tension is retained.

On the front bar 6 of the frame 1 there is mounted a standard 31, to the free end of which is pivoted one end of a lever 32, which extends rearward at one side of the driver's seat and at the rear end is provided with a handle 33 and near the center of its length on its under edge with a pierced lug 34. Lever 32 is also provided on its rear or under edge near the handle with a stud 35, projecting at a right angle therefrom. Pivoted to the lug 34 is the link-rod 36, which is bent near its connection with the lever and extends to and is pivoted at the opposite end to the projecting top end of a suitable brace 37, secured to the head-bars 15 and 16 of the frame 12 and is of a similar form as the end plates for pivoting on the shaft 11. The free end of the stud 35 is bifurcated to bestride the link-rod 36 when the lever is in its lowered position, as shown in Fig. 1, in which position the stud limits the downward movement of the lever. The length of the stud is adjusted to bring the pivotal connection of the link with the lever below a line drawn through the outer end pivots of the link and the lever. By this construction the strain of the gathering load on the teeth is downward on the stud 35, thereby preventing premature raising of the lever by the load.

Thus constructed, as the rake is drawn forward over the ground the teeth jointly gather the loose material scattered over it. When the desired load has been gathered, the driver of the rake lifts the lever 32 by its handle, thereby drawing the link-rod 36 and raising the frame 12 upward and forward in an arc, whereby the lower ends of the teeth are moved together backward and upward until they are released from the load and in a position to pass freely over it. After passing over the dumped load, the lever being then thrown downward to the normal position, the teeth are again brought into position for gathering another load.

By providing the teeth with the links 28 each individual tooth is adapted to freely rise upward through the head-frame until it slides over any ordinary surface inequalities of the ground in its path of travel without creating any greater strain on the spring-arm and without throwing it out of alinement with the other teeth. By the use of these links I therefore obtain a result that cannot be produced by the ordinary yielding spring-tooth. Should, however, any unusual obstruction be encountered by a tooth after it has first risen upward to the limit of its link 28, its spring-arm will then yield backward until the tooth slides over the obstruction. It is manifest, therefore, that by the construction shown and described I have produced a rake wherein the teeth are adapted to conjointly gather a load and to be conjointly raised to dump it, while at the same time each individual tooth is free to temporarily rise over ordinary inequalities of surface in its path without moving it out of alinement with the other teeth and to yield only to greater and unusual obstructions.

In order that the teeth may be held permanently in a raised position while passing to and from its field of operation, there are provided hook-arms 38, which are pivotally secured to the sides 7 of the frame in position to engage the top head-bar 15 of the head-frame when the latter is raised in such position.

Having fully described my invention, what I claim to be new is—

1. In a hay-rake, the combination with a wheel-base, of a head-frame pivotally mounted on the base, and normally resting thereon, a plurality of spring-arms pendent from the base, a rake-tooth for each spring-arm, a link connecting each spring-arm with a tooth and suspending the tooth vertically with its upper end portion extended through the head-frame and movable upward and downward therein as permitted by its link, and backward and upward in an arc from a vertical as permitted by its spring-arm, means to produce and retain a uniform tension on the spring-arms to pull the teeth forward and yieldingly hold them in a vertical position, and means to partially rotate the head-frame on its pivotal centers and conjointly raise the teeth backward and upward in an arc substantially as and for the purpose described.

2. In a hay-rake, the combination with a frame mounted on wheels, of a shaft mounted horizontally on the frame, a plurality of spring-arms mounted on the shaft at intervals of its length having their free ends provided with link-hooks, a head-frame for rake-teeth having arms pivotally mounted on the shaft, the head-frame being normally supported on the frame and comprising upper and lower parallel head-bars secured to the outer ends of the arms, guide members secured to the head-bars having elongated slotted openings in the vertical planes of the spring-arms, the slots of the lower guide members being offset to the rear of the openings in the upper guide members, a rake-tooth for each spring-arm, each tooth having its lower end curved forward and its upper end portion inserted through a lower and upper guide-opening, and freely movable therein, a link pivotally connecting each tooth with the closed hook end of the opposite spring-arm and suspending the tooth therefrom with the arm flexed to fulcrum the front edge of the tooth on the lower head-bar and compress the rear edge on the upper head-bar, and means to raise and then lower the head-frame on its arms, substantially as and for the purpose set forth.

3. In a hay-rake, the combination with a frame mounted on wheels, of a shaft journaled horizontally on the frame, a plurality of spring-arms mounted on the shaft at intervals of its length having their free ends provided with link-hooks, a head-frame for rake-teeth having arms pivotally mounted on the shaft, the head-frame being normally supported on the frame and comprising upper and lower parallel head-bars secured to the outer ends of the arms, guide members secured to the head-bars having elongated slotted openings in the vertical planes of the spring-arms, the slots of the lower guide members being offset to the rear of the openings in the upper guide members, a rake-tooth for each spring-arm, each tooth having its lower end curved forward and its upper end portion inserted through a lower and upper guide-opening, and freely movable therein, a link pivotally connecting each tooth with the closed hook end of the opposite spring-arm and suspending the tooth therefrom with the arm flexed to fulcrum the front edge of the tooth on the lower head-bar and compress the rear edge on the upper head-bar, means to raise and then lower the head-frame on its arms, and means to adjust the tension of the spring-arms on the teeth, substantially as and for the purpose set forth.

In witness whereof I have hereunto set my hand this 17th day of April, A. D. 1903.

LOUIS S. BORTREE.

Witnesses:
WILLIAM H. MOOR,
LAURA YOUNGS.